United States Patent
Lee

(10) Patent No.: US 11,024,155 B2
(45) Date of Patent: Jun. 1, 2021

(54) PRECISE PREDICTIVE MAINTENANCE METHOD FOR DRIVING UNIT

(71) Applicant: ITS CO., LTD., Ulsan (KR)

(72) Inventor: Young Kyu Lee, Ulsan (KR)

(73) Assignee: ITS CO., LTD., Ulsan (KR)

(*) Notice: Subject to any disclaimer, the term of this patent is extended or adjusted under 35 U.S.C. 154(b) by 0 days.

(21) Appl. No.: 17/019,294

(22) Filed: Sep. 13, 2020

(65) Prior Publication Data

US 2020/0410847 A1 Dec. 31, 2020

Related U.S. Application Data

(63) Continuation of application No. PCT/KR2018/015286, filed on Dec. 4, 2018.

(30) Foreign Application Priority Data

Mar. 14, 2018 (KR) .................. 10-2018-0029588

(51) Int. Cl.
*G08B 31/00* (2006.01)
*G08B 21/18* (2006.01)

(52) U.S. Cl.
CPC .......... *G08B 31/00* (2013.01); *G08B 21/182* (2013.01)

(58) Field of Classification Search
CPC .............................. G08B 31/00; G08B 21/182
USPC ......................................................... 340/511
See application file for complete search history.

(56) References Cited

U.S. PATENT DOCUMENTS

| | | |
|---|---|---|
| 7,010,468 B2 | 3/2006 | Gotkis et al. |
| 10,346,968 B2 * | 7/2019 | Yau ....................... G06T 7/0004 |

| | | |
|---|---|---|
| 2003/0141997 A1 | 7/2003 | Kawabe et al. |
| 2011/0264325 A1 | 10/2011 | McLaughlin et al. |
| 2014/0219071 A1 | 8/2014 | Takata |

FOREIGN PATENT DOCUMENTS

| | | |
|---|---|---|
| CN | 1435837 A | 8/2003 |
| CN | 102274031 A | 12/2011 |
| CN | 104574848 A | 4/2015 |
| CN | 105808557 A | 7/2016 |
| CN | 106645870 A | 5/2017 |
| JP | 2003-280707 A | 10/2003 |
| JP | 2010-166686 a | 7/2010 |
| JP | 2012-083721 A | 4/2012 |
| KR | 10-0856301 b1 | 9/2008 |
| KR | 10-1643599 BI | 7/2016 |

OTHER PUBLICATIONS

International Search Report issued in PCT/KR2018/015286; dated Mar. 12, 2019.
An Office Action mailed by China National Intellectual Property Administration dated Feb. 3, 2021, which corresponds to Chinese Patent Application No. 201880091165.0 and is related to U.S. Appl. No. 17/019,294; with English language Concise Explanation.

* cited by examiner

*Primary Examiner* — Ojiako K Nwugo
(74) *Attorney, Agent, or Firm* — Studebaker & Brackett PC

(57) ABSTRACT

The present invention relates to a precise predictive maintenance method for a driving unit and a configuration thereof includes a first base information collecting step S10 of collecting change information of an energy size; a second base information collecting step S20 of connecting a peak interval between a starting point and an ending point; a setting step S30 of setting an alarm gradient value, and a detecting step S40 of detecting the driving unit as an abnormal state.

2 Claims, 13 Drawing Sheets

PRECISE PREDICTIVE MAINTENANCE METHOD FOR DRIVING UNIT

CROSS-REFERENCE TO RELATED APPLICATIONS

The present application is a continuation of International Patent Application No. PCT/KR2018/015286, filed on Dec. 4, 2018, which is based upon and claims the benefit of priority to Korean Patent Application No. 10-2018-0029588, filed on Mar. 14, 2018. The disclosures of the above-listed applications are hereby incorporated by reference herein in their entirety.

TECHNICAL FIELD

The present invention relates to a precise predictive maintenance method for a driving unit, and more particularly, to a precise predictive maintenance method for a driving unit which measures and collects an integrated area value and a peak interval of a driving period from driving information of a driving unit in a normal state and driving information of the driving unit before a malfunction is generated and sets an alarm upper limit and an alarm lower limit and an alarm gradient value for the integrated area value and the peak interval of the driving period based on the collected information to compare the integrated area value and the peak interval of the driving period collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, to prevent a huge loss caused by the malfunction of the driving unit in advance.

BACKGROUND ART

Generally, stable driving is very important for a driving unit (for example, a motor, a pump, a conveyer, and a compressor) used for an automation process of equipment.

For example, hundreds of driving units are installed in the facilities of a large-scale transfer factory to continuously transfer materials to be transferred while interlocking with each other. If any one of the plurality of driving units is broken, a tremendous situation in which the entire operation of the facilities is stopped may occur.

In this case, due to the down-time caused by the malfunction of the driving unit, a huge loss may be caused by not only the repair cost of the driving unit, but also the operating cost which is wasted while the facilities are stopped and the business effect.

According to the recent data of the Ministry of Employment and Labor and the Korea Occupational Safety and Health Agency, the total number of casualties resulting from annual industry safety accidents is estimated to be about 100,000 and when it is converted into the cost, it is estimated that 18 trillion won is lost annually.

As a way to avoid such unexpected down-time costs, it is urgent to introduce a preliminary predictive maintenance system. Even though there was an effort to improve the problems in the name of predictive maintenance, for more effective predictive maintenance, it is necessary to develop a more advanced predictive maintenance method.

DISCLOSURE

Technical Problem

The present invention is proposed to solve the problems as described above and an object is to provide a precise predictive maintenance method for a driving unit which measures and collects an integrated area value and a peak interval of a driving period from driving information of a driving unit in a normal state and driving information of the driving unit before a malfunction is generated and sets an alarm upper limit and an alarm lower limit and an alarm gradient value for the integrated area value and the peak interval of the driving period based on the collected information to compare the integrated area value and the peak interval of the driving period collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, to prevent a huge loss caused by the malfunction of the driving unit in advance.

Further, another object is to provide a precise predictive maintenance method for a driving unit which presents various detection conditions in order to search for various abnormal signs which may occur in the driving unit and issues an alarm to the user when the detection conditions are satisfied to not only easily detect various abnormal signs generated in the driving unit, but also ensure an excellent reliability for a detection result.

Technical Solution

According to an aspect of the present invention, a precise predictive maintenance method for a driving unit includes: a first base information collecting step S10 of collecting change information of an energy size in accordance with a time for a driving period measured in a normal state of a driving unit and connecting a peak interval between a starting point when the driving period starts and an ending point when the driving period ends and a peak interval of repetitive another driving period based on the collected information to collect gradient information for the peak intervals between driving periods; a second base information collecting step S20 of connecting a peak interval between a starting point when the driving period starts and an ending point when the driving period ends in a driving state of the driving unit before the malfunction of the driving unit is generated and a peak interval of repetitive another driving period to collect gradient information of the peak intervals between the driving periods; a setting step S30 of setting an alarm gradient value for the peak interval between the driving periods based on the gradient information collected in the base information collecting steps S10 and S20; and a detecting step S40 of detecting the driving unit to be an abnormal state when an average gradient value for the peak interval between the driving periods measured with an interval of unit times set in the real-time driving state of the driving unit exceeds the alarm gradient value set in the setting step S30, the unit time is set to include at least two driving periods, and an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

Further, the repetitive driving period is extracted by setting a period between a starting point and an ending point with the starting point when an energy value of the driving unit exceeds a set offset value and the ending point when the energy value falls below the offset value as the driving period.

Further, in the first base information collecting step S10, an integrated area of the driving period in the normal driving state of the driving unit is extracted and the integrated area value of the driving period and an integrated area value of repetitive another driving period are connected to collect gradient information for the integrated area value between the driving period, in the second base information collecting step S20, an integrated area of a driving period in a driving state of the driving unit before the malfunction of the driving unit is generated is extracted and the integrated area value of the driving period and an integrated area value of repetitive another driving period are connected to collect gradient information for the integrated area value between the driving period, in the setting step S30, an alarm gradient value for the integrated area value between the driving periods is set based on the gradient information collected in the base information collecting steps S10 and S20, and in the detecting step S40, when an average gradient value for the integrated area value between the driving periods measured with the interval of unit times set in the real-time driving state of the driving unit exceeds the alarm gradient value set in the setting step S30, the driving unit is detected to be an abnormal state, and the unit time is set to include at least two driving periods.

Further, a repetitive driving period may be extracted by forcibly dividing the change information of the energy size in accordance with the time of the driving unit in accordance with a set peak interval and setting the divided period as the driving period.

Further, in the first base information collecting step S10, the information about the integrated area value and the peak interval of the driving period is collected from the change information of the energy size in accordance with the time for the driving period measured in the normal driving state of the driving unit, in the second base information collecting step S20, the information about the integrated area value and the peak interval of the driving period is collected from the change information of the energy size in accordance with the time for the driving period measured in the driving state of the driving unit before the malfunction of the driving unit is generated, in the setting step S30, an alarm upper limit and an alarm lower limit for the integrated area value and the peak interval of the driving period are set based on the gradient information collected in the base information collecting steps S10 and S20, and in the detecting step S40, when the integrated area value or the peak interval of the driving period of the change information of the energy size in accordance with the time measured in the real-time driving state of the driving unit exceeds the alarm upper limit of the integrated area value or the peak interval set in the setting step S30 or is lower than the alarm lower limit, the driving unit is detected to be an abnormal state.

Advantageous Effects

According to the present invention, the precise predictive maintenance method for a driving unit measures and collects an integrated area value and a peak interval of a driving period from driving information of a driving unit in a normal state and driving information of the driving unit before a malfunction is generated and sets an alarm upper limit and an alarm lower limit and an alarm gradient value for the integrated area value and the peak interval of the driving period based on the collected information to compare the integrated area value, the peak interval of the driving period collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

BEST MODE

The present invention relates to a precise predictive maintenance method for a driving unit and a configuration thereof includes: a first base information collecting step S10 of collecting change information of an energy size in accordance with a time for a driving period measured in a normal state of a driving unit and connecting a peak interval between a starting point when the driving period starts and an ending point when the driving period ends and a peak interval of repetitive another driving period based on the collected information to collect gradient information for the peak interval between driving periods; a second base information collecting step S20 of connecting a peak interval between a starting point when the driving period starts and an ending point when the driving period ends in a driving state of the driving unit before the malfunction of the driving unit is generated and a peak interval of repetitive another driving period to collect gradient information of the peak intervals between the driving periods; a setting step S30 of setting an alarm gradient value for the peak interval between the driving periods based on the gradient information collected in the base information collecting steps S10 and S20, and a detecting step S40 of detecting the driving unit as an abnormal state when an average gradient value for the peak interval between the driving periods measured with an interval of unit times set in the real-time driving state of the driving unit exceeds the alarm gradient value set in the setting step S30.

MODE FOR CARRYING OUT THE INVENTION

A precise predictive maintenance method for a driving unit according to an exemplary embodiment of the present invention will be described in detail based on the accompanying drawings. A detailed description of known functions and configurations determined to unnecessarily obscure the gist of the present invention will be omitted.

Figure 1:
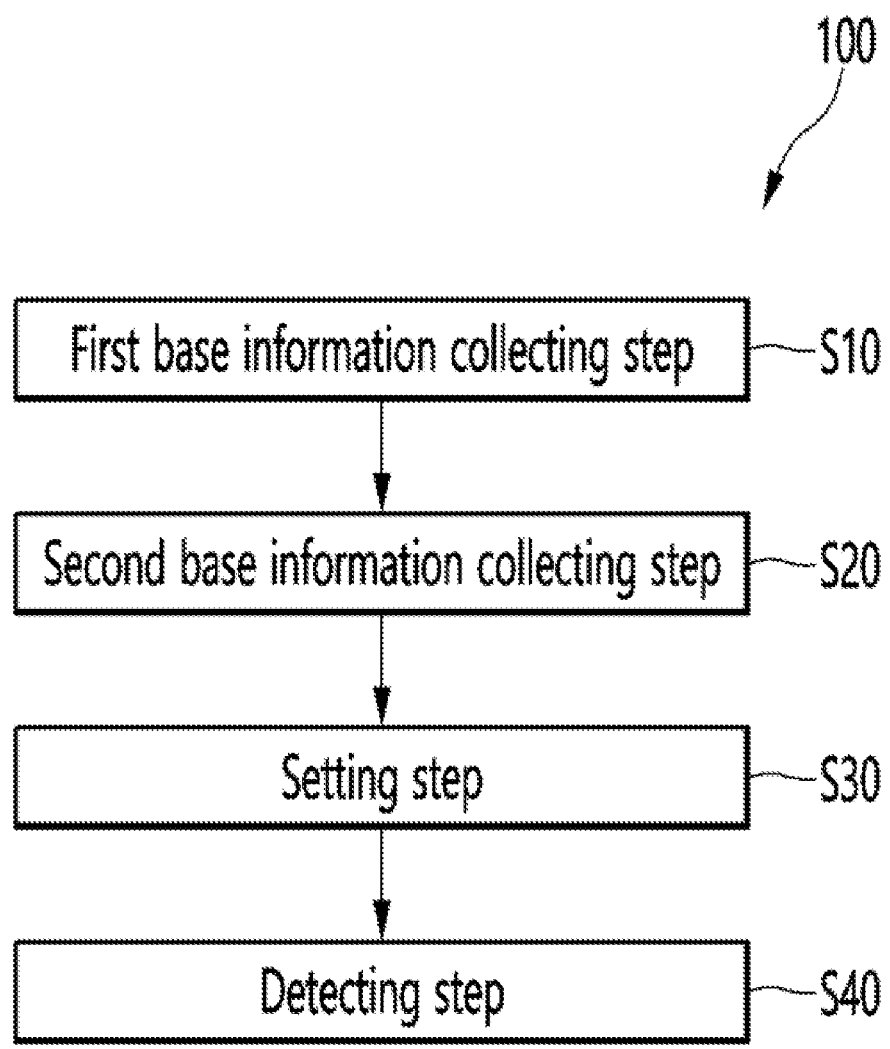
FIG. 1 is a block diagram of a precise predictive maintenance method for a driving unit according to an embodiment of the present invention.
Figure 2:
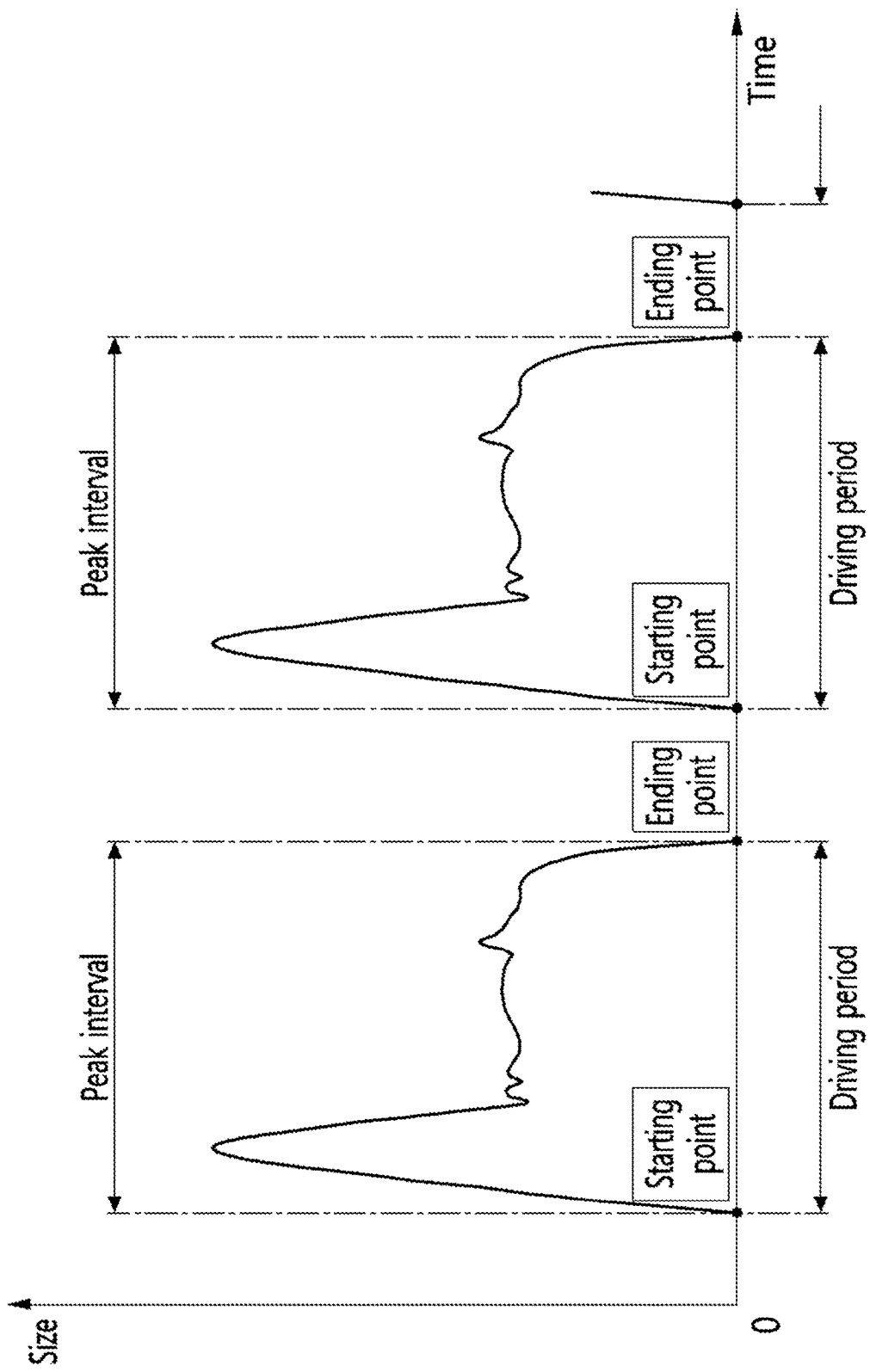
FIG. 2 is a view for extracting a peak interval of a driving period of a driving unit.
Figure 3:
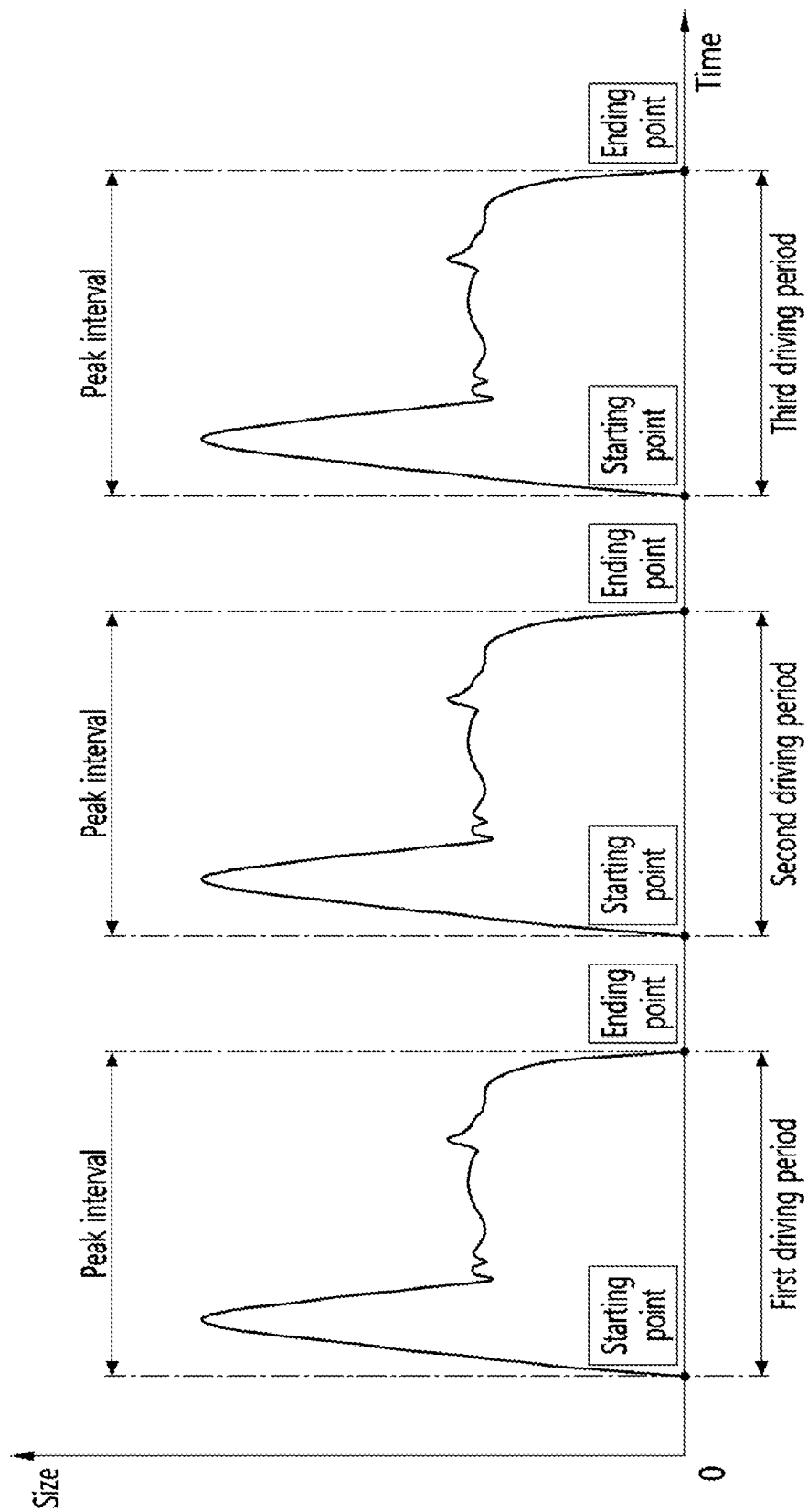
FIG. 3 is a view for extracting a peak interval for each of repetitive driving periods of a driving unit.
Figure 4:
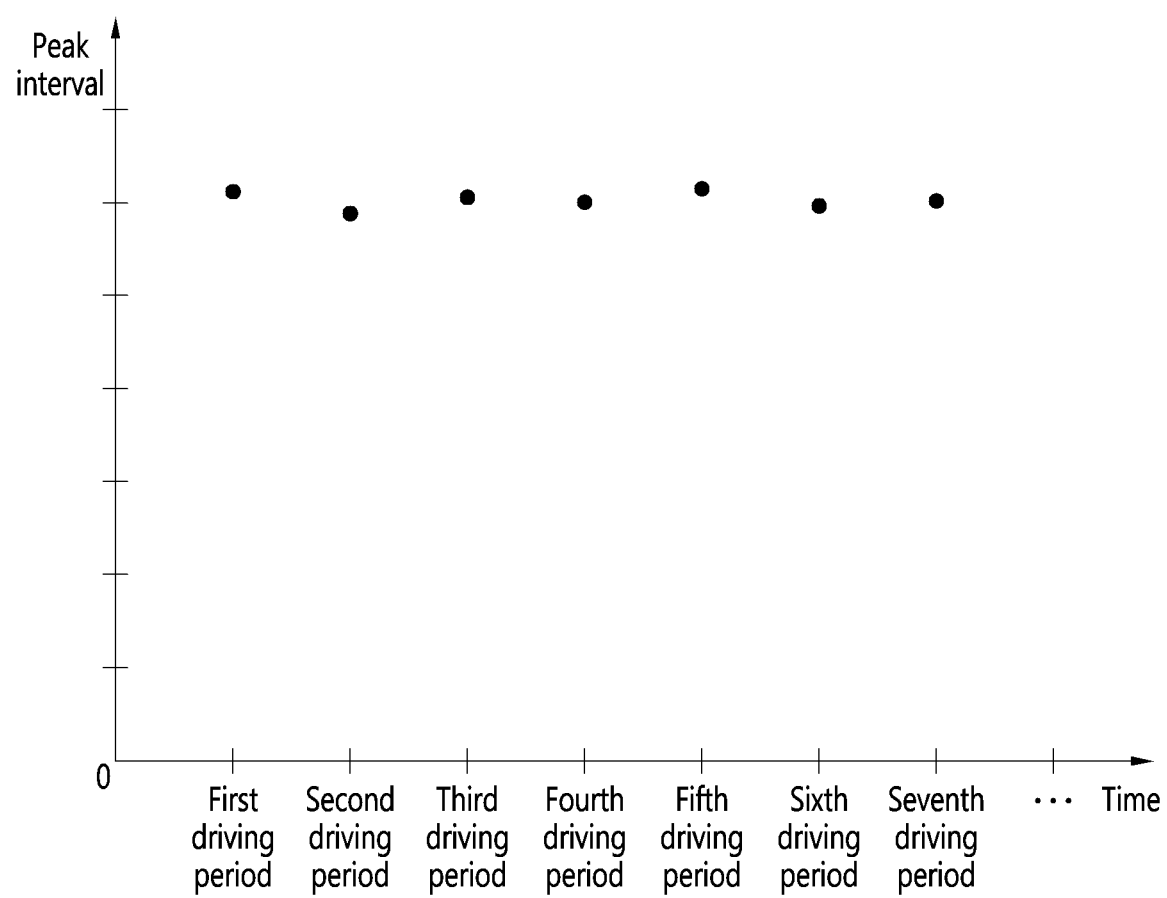
FIG. 4 is a view illustrating a numerical value of a peak interval illustrated in FIG. 3.
Figure 5:
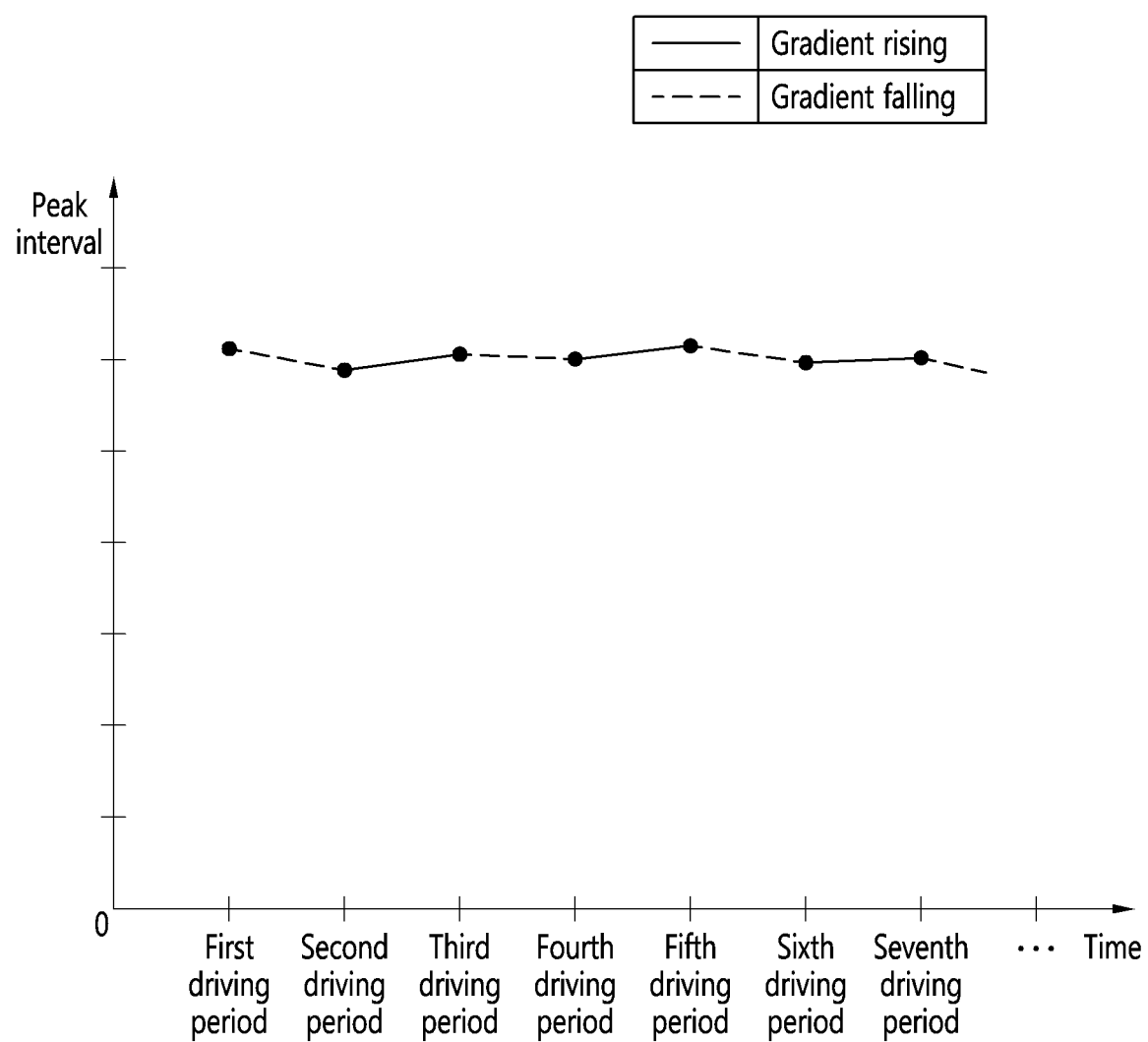
FIG. 5 is a view for extracting a gradient value based on the peak interval illustrated in FIG. 4.
Figure 6:
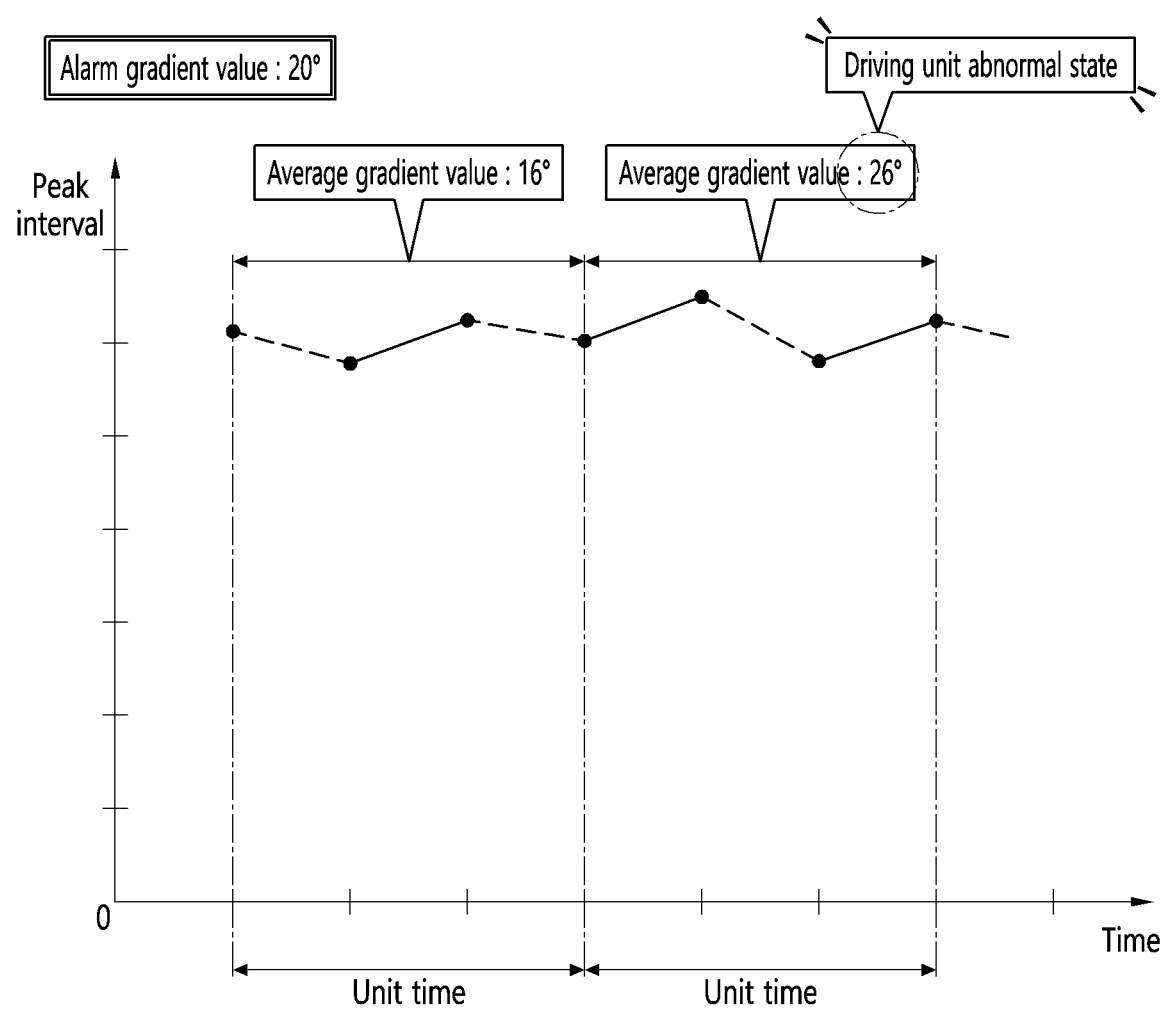
FIG. 6 is a view for extracting an average gradient value of the peak interval between driving periods measured with an interval of unit times.
Figure 7:
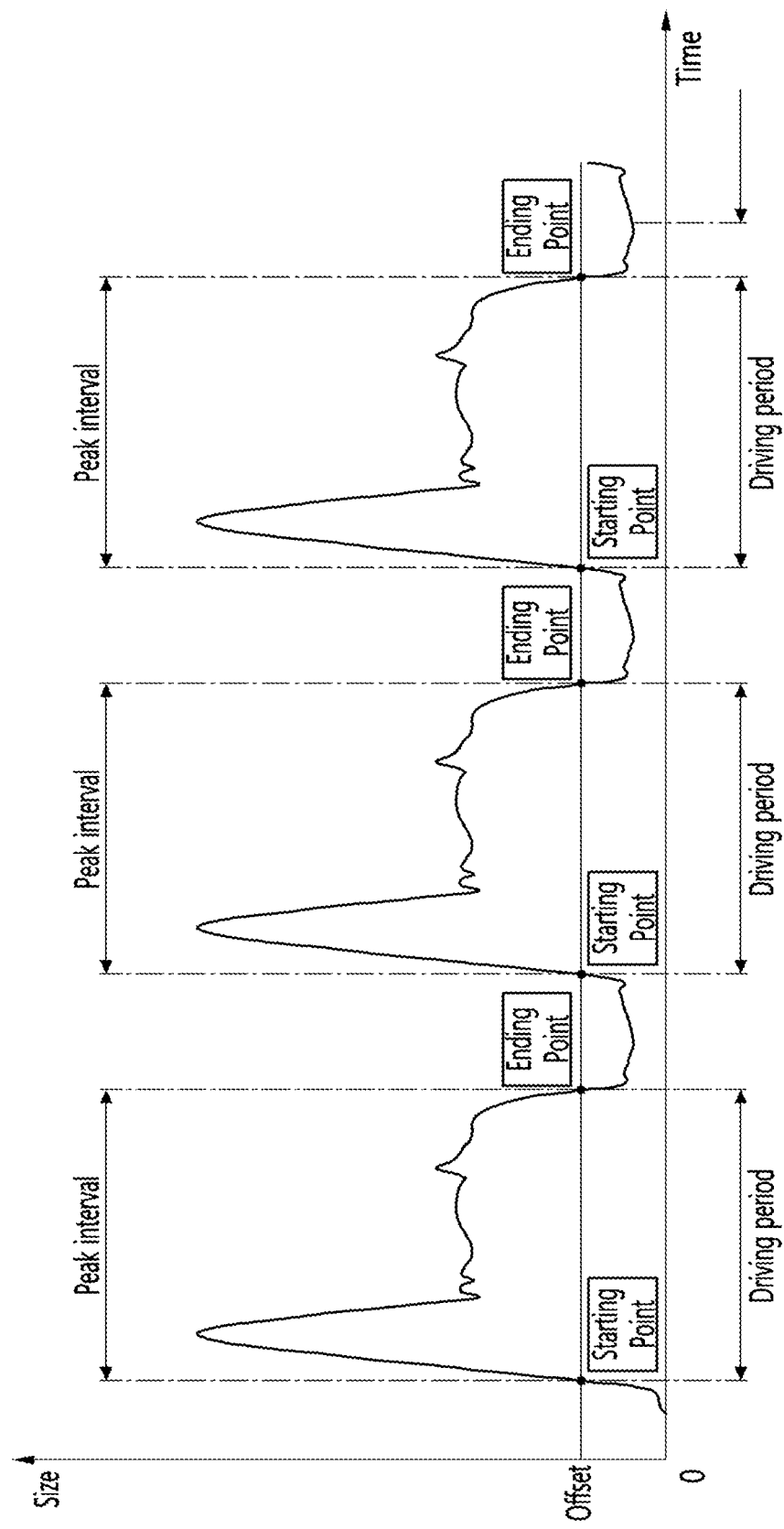
FIG. 7 is a view for extracting a driving period from a driving unit which is repeatedly driven and paused.
Figure 8:
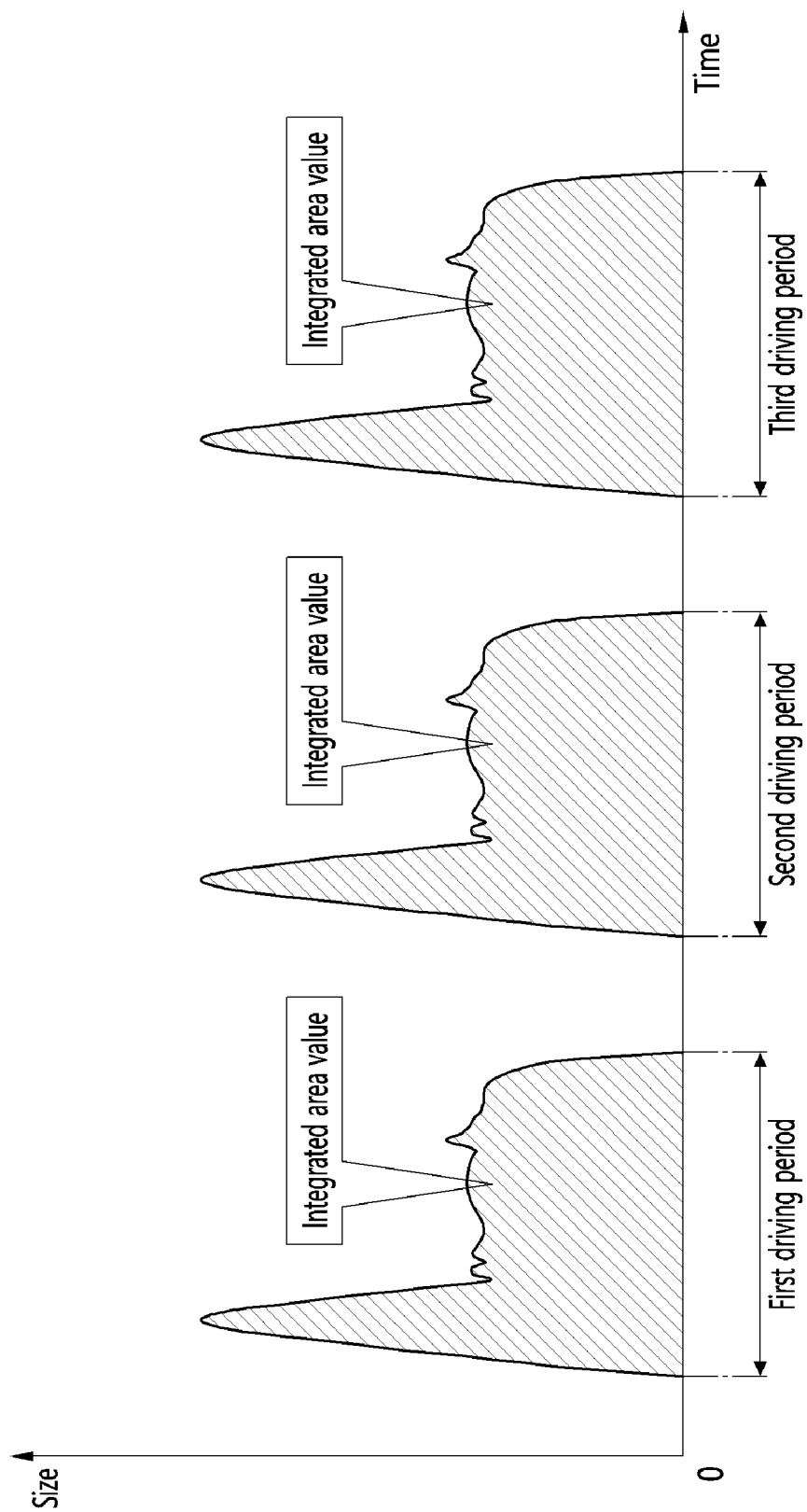
FIG. 8 is a view for extracting an integrated area value for each of repetitive driving periods of a driving unit.
Figure 9:
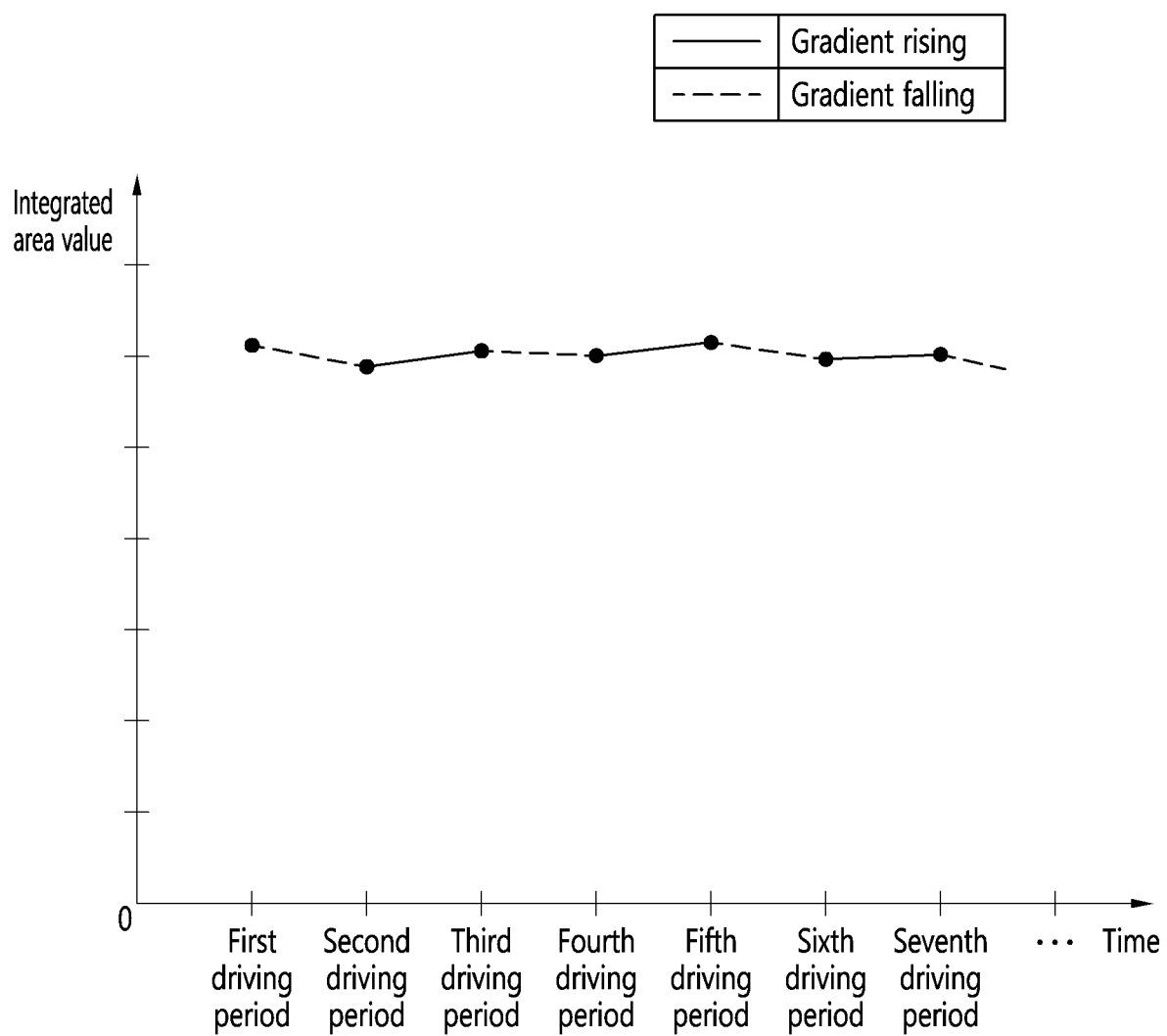
FIG. 9 is a view for extracting a gradient value based on an integrated area value illustrated in FIG. 8.
Figure 10:
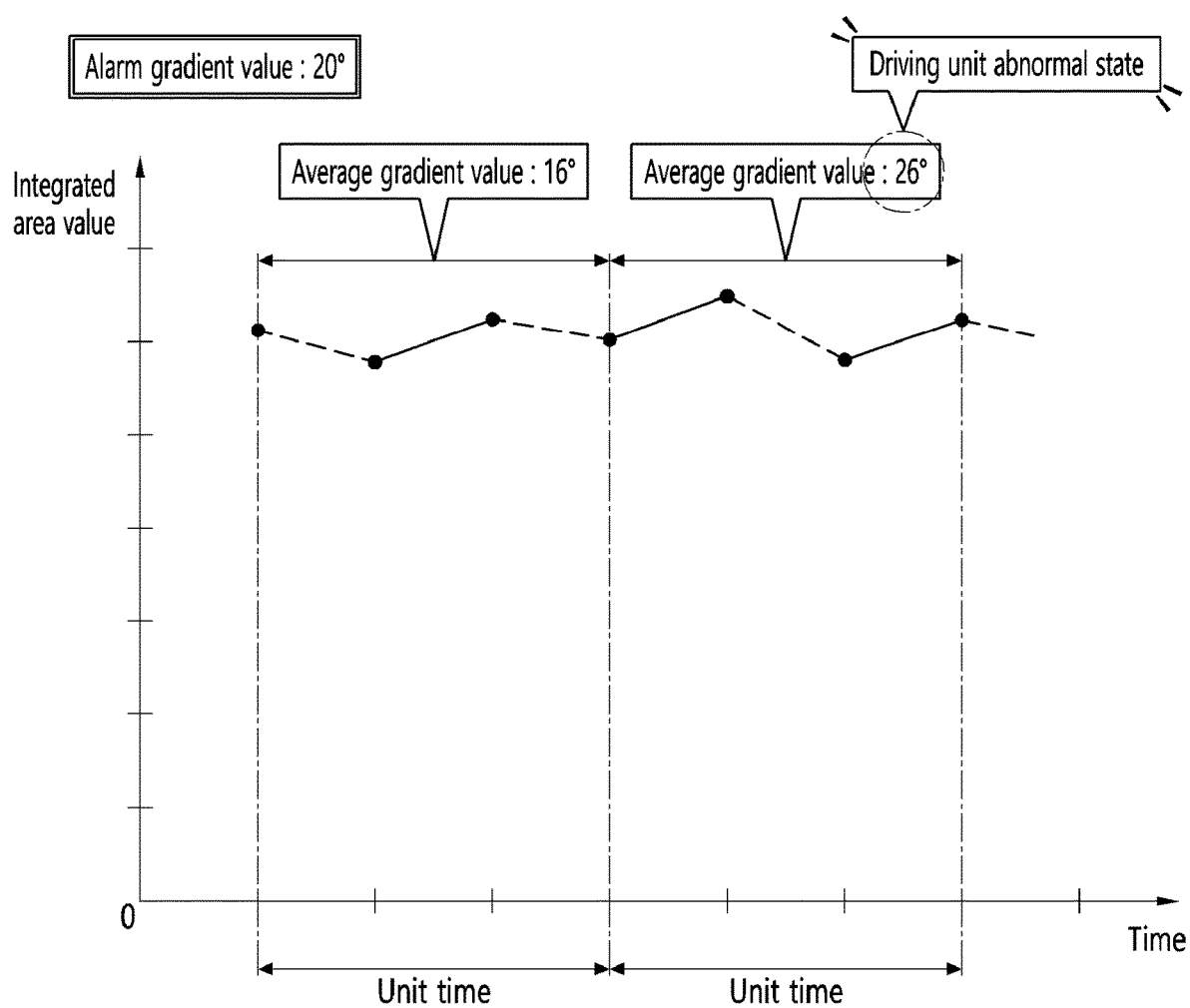
FIG. 10 is a view for extracting an average gradient value of the integrated area values between driving periods measured with an interval of unit times.
Figure 11:
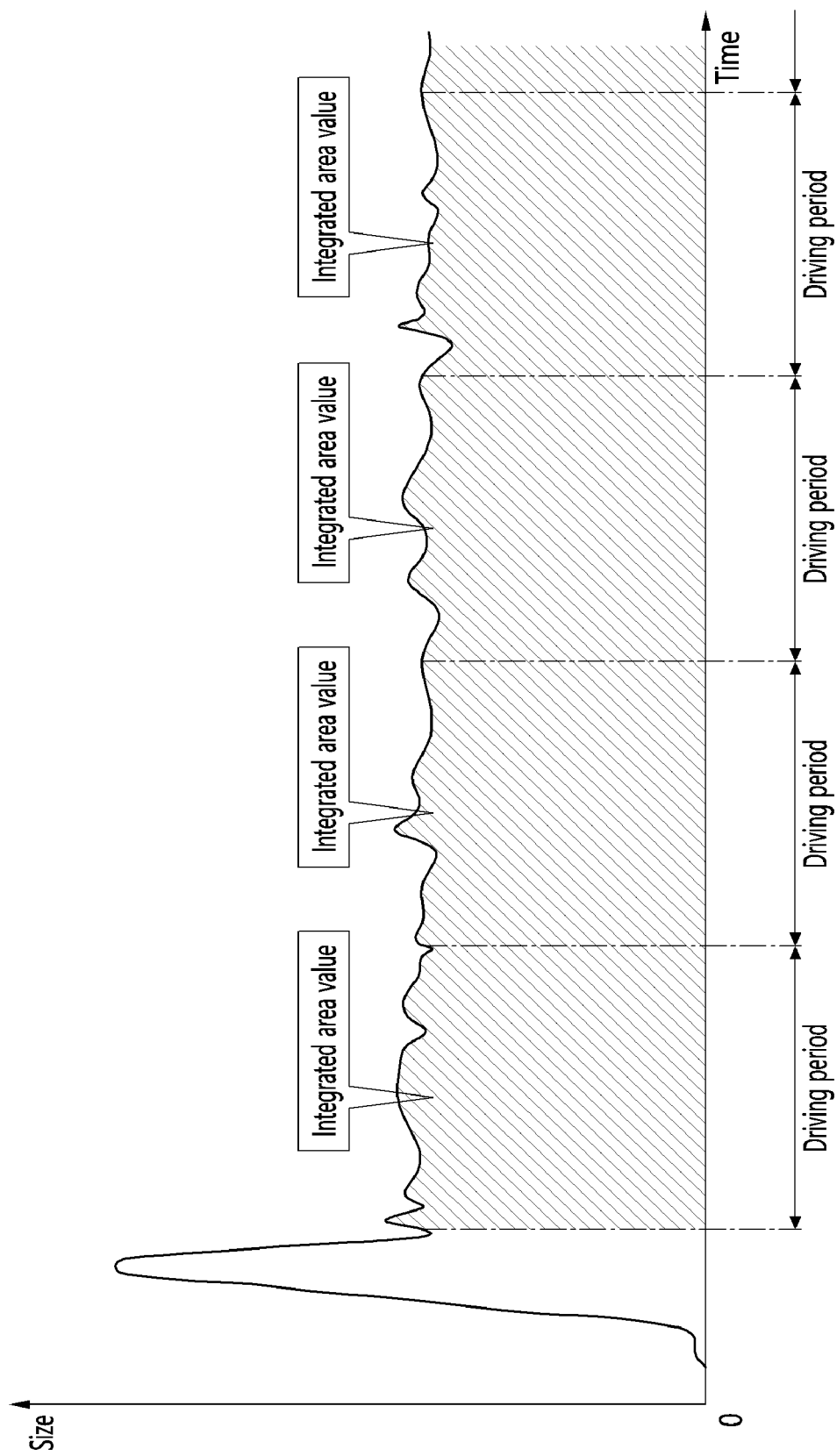
FIG. 11 is a view for extracting a driving period from a driving unit which is continuously driven.
Figure 12:
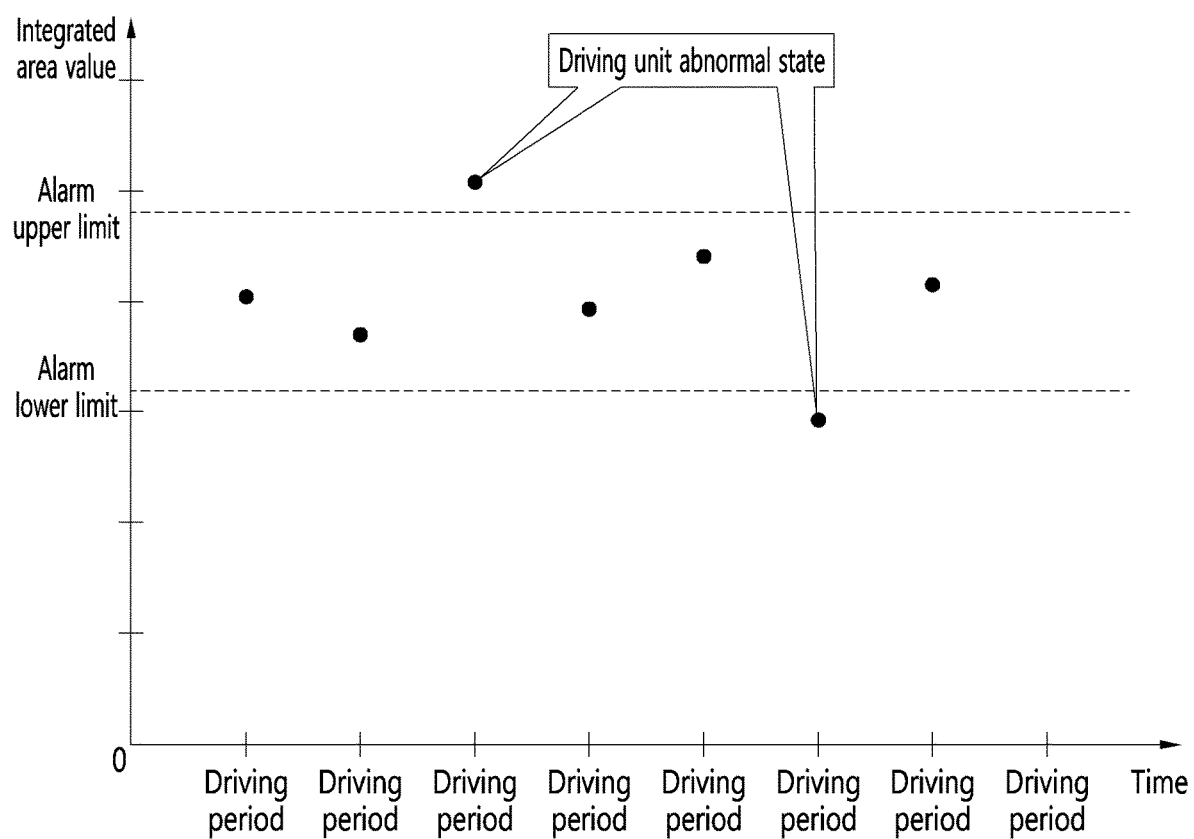
FIG. 12 is a view for detecting an abnormal state of a driving unit with an integrated area value of a driving period measured in a real-time driving state of a driving unit.
Figure 13:
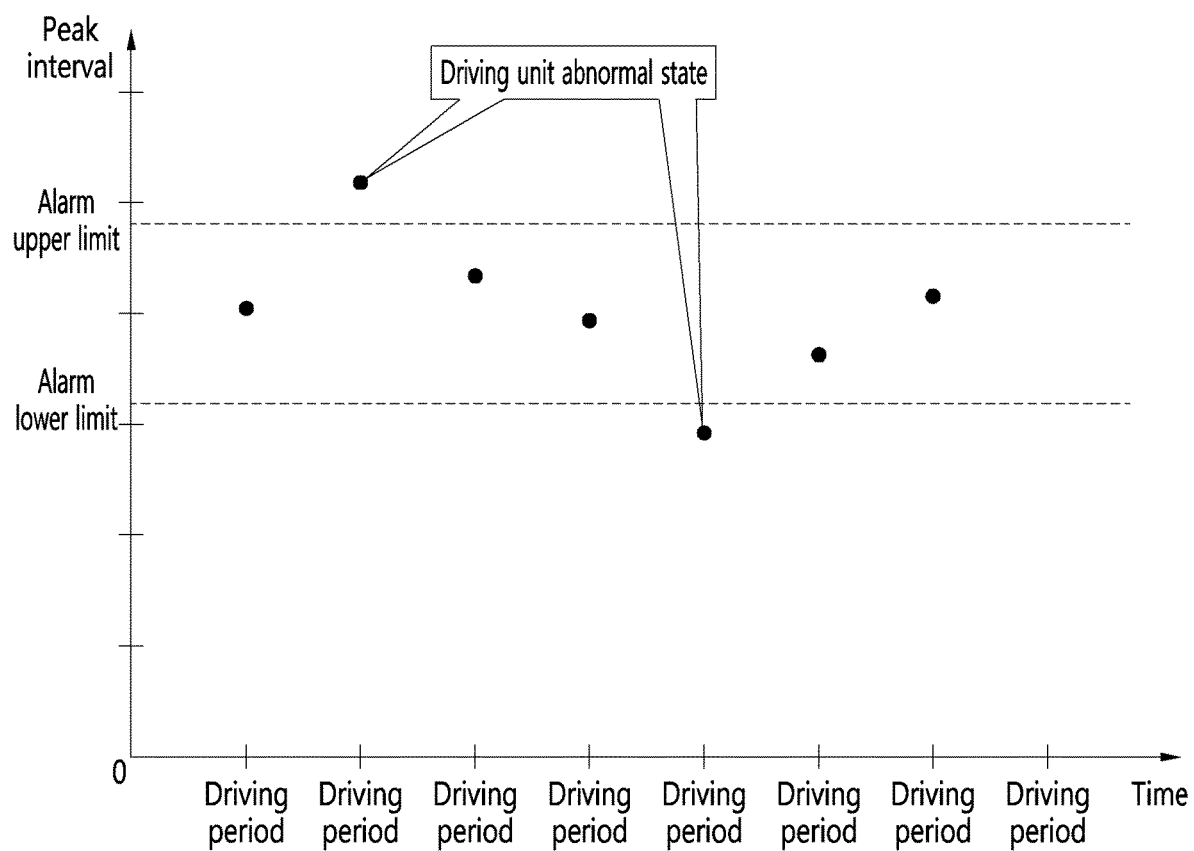
FIG. 13 is a view for detecting an abnormal state of a driving unit with a peak interval of a driving period measured in a real-time driving state of a driving unit.

FIGS. 1 to 13 illustrate a precise predictive maintenance method for a driving unit according to the exemplary embodiment of the present invention, in which FIG. 1 is a block diagram of a precise predictive maintenance method for a driving unit according to an embodiment of the present invention, FIG. 2 is a view for extracting a peak interval of a driving period of a driving unit, FIG. 3 is a view for extracting a peak interval for each of repetitive driving periods of a driving unit, FIG. 4 is a view illustrating a numerical value of a peak interval illustrated in FIG. 3, FIG. 5 is a view for extracting a gradient value based on the peak interval illustrated in FIG. 4, FIG. 6 is a view for extracting an average gradient value of the peak interval between driving periods measured with an interval of unit times, FIG. 7 is a view for extracting a driving period from a driving unit which is repeatedly driven and paused, FIG. 8 is a view for extracting an integrated area value for each of repetitive driving periods of a driving unit, FIG. 9 is a view for extracting a gradient value based on an integrated area value illustrated in FIG. 8, FIG. 10 is a view for extracting an average gradient value of the integrated area value between driving periods measured with an interval of unit times, FIG. 11 is a view for extracting a driving period from a driving unit which is continuously driven, FIG. 12 is a view for detecting an abnormal state of a driving unit with an integrated area value of a driving period measured in a real-time driving state of a driving unit, and FIG. 13 is a view for detecting an abnormal state of a driving unit with a peak interval of a driving period measured in a real-time driving state of a driving unit.

As illustrated in FIG. 1, the precise predictive maintenance method 100 for a driving unit according to an embodiment of the present invention relates to a predictive maintenance method for a driving unit which is repeatedly driven and paused and includes a first base information collecting step S10, a second base information collecting step S20, a setting step S30, and a detecting step S40.

The first base information collecting step S10 is a step of collecting change information of an energy size in accordance with a time for a driving period measured in a normal state of a driving unit and connecting a peak interval between a starting point when the driving period starts and an ending point when the driving period ends and a peak interval of repetitive another driving period based on the collected information to collect gradient information for the peak interval between driving periods.

Here, when a current consumed to operate the driving unit is assumed as the energy of the driving unit, generally, the driving period of the driving unit forms a waveform in which the energy size of the driving unit is formed to be maximum at a timing of beginning the driving which requests a high current and then is gradually stabilized to continuously maintain a constant range of energy values.

That is, as illustrated in FIG. 2, in the precise predictive maintenance method 100 for a driving unit of the present invention, basically, a waveform of the driving period of the driving unit is measured and a point when the measured waveform starts is set as a starting point and a point when the waveform ends is set as an ending point to extract and collect a peak interval of the driving period.

A gradient for the peak interval is measured by the peak interval between the driving periods collected as described above, which will be described in more detail below.

The information collected as described above becomes a base of various alarm values set to detect an abnormal sign of the driving unit in the setting step S30 and the detecting step S40 which will be described below.

In the meantime, an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit, but is not limited thereto.

In the second base information collecting step S20, a peak interval between a starting point when the driving period starts and an ending point when the driving period ends in a driving state of the driving unit before the malfunction of the driving unit is generated and a peak interval of repetitive another driving period are connected to collect gradient information of the peak intervals between the driving periods.

The information collected as described above also becomes a base of various alarm values set to detect an abnormal sign of the driving unit in the setting step S30 and the detecting step S40 together with the information collected in the first base information collecting step S10.

The setting step S30 is a step of setting an alarm gradient value for the peak interval between the driving periods based on the gradient information collected in the base information collecting steps S10 and S20.

That is, the alarm gradient value for the peak interval between the driving periods may also be set based on a value when a gradient for a peak interval between the driving periods is abnormally changed before the malfunction of the driving unit is generated based on information collected in the base information collecting steps S10 and S20 for a long time, that is, a value when the gradient value for the peak interval between the driving periods is abnormally changed in a situation such as deterioration, aging of the driving unit or load due to the jamming of the foreign material.

In the detecting step S40, when an average gradient value for the peak interval between the driving periods measured with the interval of unit times set in the real-time driving state of the driving unit exceeds an alarm gradient value set in the setting step S30, the driving unit is detected to be an abnormal state and the unit time is set to include at least two driving periods.

That is, in the first base information collecting step S10, as illustrated in FIG. 3, the peak interval of repetitive driving periods of the driving unit is collected and the peak interval of each of the driving periods is represented in accordance with the time. For the convenience of description, when the repetitive driving periods are sequentially defined as a first driving period, a second driving period, . . . and an n-th driving period, the peak interval may be represented as illustrated in FIG. 4.

Thereafter, as illustrated in FIG. 5, the peak intervals of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the peak interval between the driving periods of the driving unit before the malfunction of the driving unit is generated is collected. In the setting step S30, an alarm gradient value for the peak interval between the driving periods is set based on the gradient information collected in the base information collecting steps S10 and S20.

Therefore, in the detecting step S40, as illustrated in FIG. 6, when an average gradient value obtained by connecting the peak intervals between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, as the driving period, a period between a starting point and an ending point is set with the starting point when the energy value of the driving unit exceeds an offset value set in the setting step S30 and the ending point when the energy value falls below the offset value. By doing this, as illustrated in FIG. 7, a repetitive driving period may be clearly extracted from the driving unit which is repeatedly stopped and paused so that the predictive maintenance of the driving unit may be easily induced.

Moreover, even though the driving unit is paused and is not completely stopped, the offset value is set as illustrated in FIG. 7, so that the driving period of the driving unit may be forcibly extracted with a point when the energy value of the driving unit falls below the offset value as an ending point. Therefore, the predictive maintenance of the driving unit with various driving conditions may be easily induced.

Here, the method of extracting the driving period of the driving unit by setting an interval of the offset value is also applicable to a predictive maintenance method of the driving unit which will be described below.

Further, in the first base information collecting step S10, an integrated area of the driving period in the normal driving state of the driving unit is extracted and the integrated area value of the driving period and an integrated area value of repetitive another driving period are connected to collect gradient information for the integrated area value between the driving period.

In the second base information collecting step S20, an integrated area of a driving period in a driving state of the driving unit before the malfunction of the driving unit is generated is extracted and the integrated area value of the driving period and an integrated area value of repetitive another driving period are connected to collect gradient information for the integrated area value between the driving period.

In the setting step S30, an alarm gradient value for the integrated area value between the driving periods is set based on the gradient information collected in the base information collecting steps S10 and S20.

In the detecting step S40, when an average gradient value for the integrated area value between the driving periods measured with the interval of unit times set in the real-time driving state of the driving unit exceeds the alarm gradient value set in the setting step S30, the driving unit is detected to be an abnormal state and the unit time is set to include at least two driving periods.

That is, as illustrated in FIG. 8, in the first base information collecting step S10, the integrated area value of a repetitive driving period of the driving unit and the integrated area value of another driving period are collected. For the convenience of description, when the repetitive driving periods are sequentially defined as a first driving period, a second driving period, . . . and an n-th driving period, the integrated area value will be represented as illustrated in FIG. 9.

Here, the integrated area value of the driving period is a value obtained by digitizing a value obtained by measuring an internal area of a waveform which represents an energy size of the driving period by change information in accordance with a time.

Thereafter, as illustrated in FIG. 9, the integrated area values of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the integrated area value between the driving periods of the driving unit before the malfunction of the driving unit is generated is collected. In the setting step S30, an alarm gradient value for the integrated area value between the driving periods is set based on the gradient information collected in the base information collecting steps S10 and S20.

Therefore, in the detecting step S40, as illustrated in FIG. 10, when an average gradient value obtained by connecting the integrated area values between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, a repetitive driving period may be extracted by forcibly dividing the change information of the energy size in accordance with the time of the driving unit in accordance with a set peak interval and setting the divided period as the driving period.

That is, as illustrated in FIG. 11, when the driving unit is driven once, the driving unit is continuously driven without being stopped so that the repetitive driving period cannot be extracted. Therefore, the mean period is forcibly divided in accordance with the peak interval set in the setting step S30 to extract a plurality of driving periods so that the predictive maintenance of the driving unit with various driving conditions may be easily induced.

Further, in the first base information collecting step S10, the information about the integrated area value and the peak interval of the driving period is collected from the change information of the energy size in accordance with the time for the driving period measured in the normal driving state of the driving unit.

In the second base information collecting step S20, the information about the integrated area value and the peak interval of the driving period is collected from the change information of the energy size in accordance with the time for the driving period measured in the driving state of the driving unit before the malfunction of the driving unit is generated.

In the setting step S30, an alarm upper limit and an alarm lower limit for the integrated area value and the peak interval of the driving period are set based on the gradient information collected in the base information collecting steps S10 and S20.

In the detecting step S40, when the integrated area value of the driving period or the peak interval of the change information of the energy size in accordance with the time measured in the real-time driving state of the driving unit exceeds the alarm upper limit of the integrated area value or the peak interval set in the setting step S30 or is lower than the alarm lower limit, the driving unit is detected to be an abnormal state.

That is, the alarm upper limit and the alarm lower limit for the integrated area value and the peak interval of the driving period are set based on a value that the integrated area value and the peak interval of the driving unit are abnormally changed before the malfunction of the driving unit is generated, based on the information collected for a long time in the base information collecting steps S10 and S20.

Therefore, as illustrated in FIGS. 12 and 13, when the integrated area value or the peak interval measured in the real-time driving state of the driving unit exceeds the alarm upper limit or is formed to be lower than the alarm lower limit, the driving unit is detected to be an abnormal state. Therefore, before the malfunction of the driving unit is generated, the driving unit is managed to be replaced or repaired in advance so that the economic loss to be caused by stopping the operation of the facilities due to the malfunction of the driving unit may be prevented in advance.

The precise predictive maintenance method for a driving unit which detects an abnormal sign of the driving unit by the above-described processes measures and collects an integrated area value of a driving period and a peak interval from driving information of a driving unit in a normal state and driving information of the driving unit before a malfunction is generated and sets an alarm upper limit and an alarm lower limit and an alarm gradient value for the integrated area value and the peak interval of the driving period based on the collected information to compare the integrated area value of the driving period, the peak interval collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

In the meantime, the precise predictive maintenance method 100 of the driving unit according to the embodiment of the present invention may also be implemented by a combination of various electronic devices and programs which are capable of collecting, detecting, comparing an energy value of the driving unit and issuing an alarm.

The present invention has been described with reference to the exemplary embodiment illustrated in the drawing, but the exemplary embodiment is only illustrative and the present invention is not limited thereto. Further, it would be appreciated by those skilled in the art that various modifications and equivalent exemplary embodiments may be made. Further, those skilled in the art may modify the present invention without departing from the spirit of the present invention. Accordingly, the scope of claiming the rights of the present invention is not defined within the scope of the detailed description, but may be limited by the following claims and the technical spirit thereof.

What is claimed is:

1. A precise predictive maintenance method used for various facilities for a driving unit which is repeatedly driven and paused, the method comprising:
a first base information collecting step of collecting change information of an energy size in accordance with a time for a driving period measured in a normal state of the driving unit and connecting a peak interval between a starting point when the driving period starts and an ending point when the driving period ends and a peak interval between a starting point and an ending point of repetitive another driving period based on the collected information to collect gradient information for the peak interval between driving periods;
a second base information collecting step of connecting a peak interval between a starting point when the driving period starts and an ending point when the driving period ends in a driving state of the driving unit before the malfunction of the driving unit is generated and a peak interval between a starting point and an ending point of repetitive another driving period to collect gradient information of the peak intervals between the driving periods;
a setting step of setting an alarm gradient value for the peak interval between the driving periods based on the gradient information collected in the first and second base information collecting steps; and
a detecting step of detecting the driving unit to be an abnormal state when an average gradient value for the peak interval between the driving periods measured with an interval of unit times set in the real-time driving state of the driving unit exceeds the alarm gradient value set in the setting step,
wherein the unit time is set to include at least two driving periods, and an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

2. The precise predictive maintenance method for a driving unit of claim 1, wherein a repetitive driving period is extracted by forcibly dividing the change information of the energy size in accordance with the time of the driving unit in accordance with a set peak interval and setting the divided period as the driving period.

\* \* \* \* \*